(12) United States Patent
Ambrus

(10) Patent No.: US 7,325,678 B2
(45) Date of Patent: Feb. 5, 2008

(54) GOODS PROTECTION DEVICE

(76) Inventor: Sandor Z. Ambrus, 34 Heathdale Road, Toronto, Ontario (CA) M6C 1M6

( * ) Notice: Subject to any disclaimer, the term of this patent is extended or adjusted under 35 U.S.C. 154(b) by 485 days.

(21) Appl. No.: 10/929,464

(22) Filed: Aug. 31, 2004

(65) Prior Publication Data

US 2005/0230275 A1    Oct. 20, 2005

(51) Int. Cl.
*B65D 85/30*    (2006.01)
(52) U.S. Cl. .................................. 206/308.1; 206/309
(58) Field of Classification Search ............ 206/308.1, 206/309, 310, 311, 312, 493, 1.5, 308.2, 303
See application file for complete search history.

(56) References Cited

U.S. PATENT DOCUMENTS

| | | | |
|---|---|---|---|
| 5,598,728 A | | 2/1997 | Lax |
| 5,850,752 A | | 12/1998 | Lax |
| 5,901,840 A | | 5/1999 | Nakasuji |
| 5,904,246 A | | 5/1999 | Weisburn et al. |
| 5,906,275 A | * | 5/1999 | Jokic ........................ 206/308.1 |
| 6,193,061 B1 | * | 2/2001 | Lew et al. ................ 206/308.1 |
| 6,279,739 B1 | * | 8/2001 | Moore et al. ................ 206/312 |
| 6,283,284 B1 | * | 9/2001 | Crane et al. ................. 206/310 |
| 6,296,115 B1 | * | 10/2001 | Kurosawa et al. ........ 206/308.1 |
| 2004/0031708 A1 | | 2/2004 | Spagna |

FOREIGN PATENT DOCUMENTS

EP    402822    12/1990
FR    2688483    9/1993

* cited by examiner

*Primary Examiner*—Shian T. Luong

(57) ABSTRACT

A goods protection device for the sale and/or rental distribution of information carrier discs, including CDs and DVDs, is disclosed. The goods protection device generally comprises a housing encasing a storage space. The housing is provided with a fastening unit consisting of a locking piece and another locking piece cooperating with it. The housing is constructed as a protecting envelope comprising a first protecting plate and a second protecting plate, at least part of the first protecting plate and the second protecting plate separated from each other by a space. The space has a maximum width of six times the width of the information carrier disc. Therefore, at least a part of the information carrier disc is temporarily accommodated within the space of the protecting envelope consisting of the first and second protecting plates. The first protecting plate of the protecting envelope is surrounded by a first bordering rim and the second protecting plate of the protecting envelope is surrounded by a second bordering rim such as at least a part of the first bordering rim of the first protecting plate and at least a part of the second bordering rim of the second protecting plate are inseparably fastened together by a connection piece. While in the section of the first and second bordering rims where there is no connection piece, there is a passage connected to the space created for temporarily accommodating at least a part of the information carrier disc. At least one of the first and second protecting plates has a free flap in the vicinity of the passage such that the one locking piece of the fastening unit is fixed into the free flap in a fixed position and the other locking piece of the fastening unit is connected to the one locking piece freely in its normal position or at least partly covering the centre hole of the information carrier disc through this hole when it is being used.

10 Claims, 1 Drawing Sheet

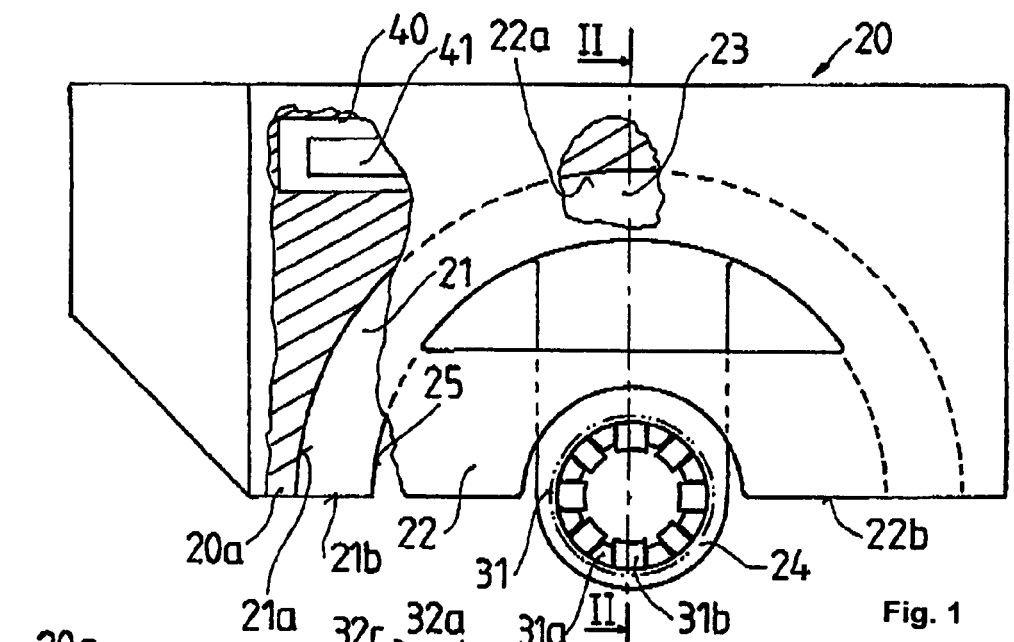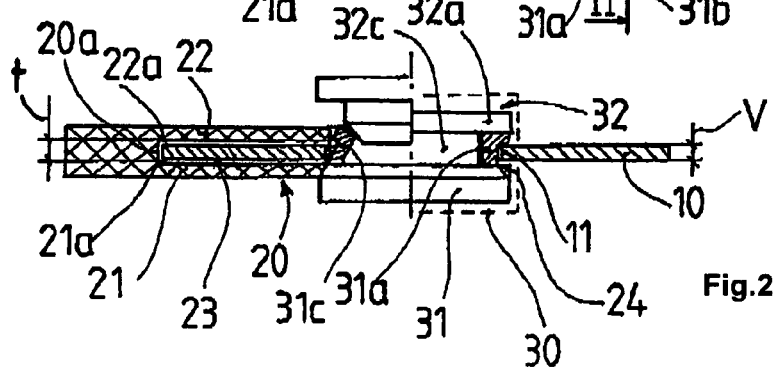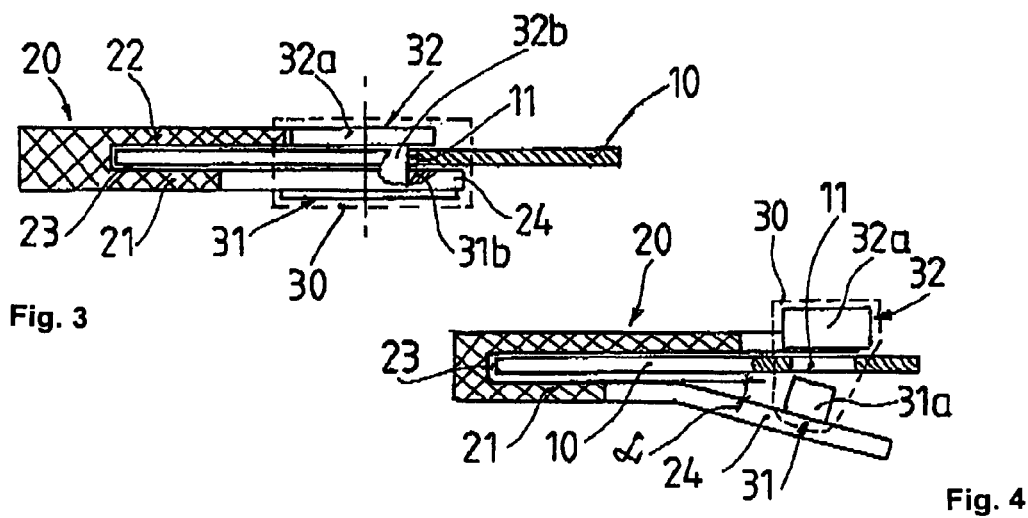

GOODS PROTECTION DEVICE

FIELD OF THE INVENTION

The subject of the invention is a goods protection device for the sale and especially rental distribution of information carrier discs such as CD-s and DVD-s, which has a house encasing a storage space, and the house is provided with a fastening unit consisting of a locking piece and another locking piece co-operating with it.

BACKGROUND OF THE INVENTION

Due to the development of information technology, digital signal transmission and data recording pre-recorded CD-s and DVD-s have become widely used on which previously recorded and stored image and sound information, such as musical recordings or films are offered for sale. Such data carriers are sold in protective cases in the interest of protecting them against external effects.

In the case of pre-recorded CD-s and DVD-s a group of known goods protecting devices is formed by at least partly transparent cases in the internal space of which the storage cases of the information carrier discs and signal transmitters starting off a suitably alarm device can be placed. Goods protecting cases consist of two pieces that can be taken apart, and when they are closed they are fastened with a locking structure, which can only be opened with special tools. Such solutions are described for example in patents No. EP 402,822; U.S. Pat. No. 5,904,246; U.S. Pat. No. 5,901,840; U.S. Pat. No. 5,850,752; U.S. Pat. No. 5,598,728 and FR 2,688,483.

SUMMARY OF THE INVENTION

The undoubted advantage of such goods protection devices is that they reduce the possibility of shop thefts. However, the disadvantage of these constructions is that the use of goods protecting cases increases the space demand of the displayed products on the one part, which results in a relative smaller sales are in the shops. On the other part the information carrying disc, its case and the introductory material placed in the storage case are accessible.

This is a significant deficiency when the information carrying discs are used for rental purposes, as those who intend to rent the discs can make their choice by looking at the words and pictures on or in the storage case directly, without being restricted.

Consequently goods protecting device encasing the storage case do not suit the sales strategy and goods protection pursuits of companies dealing with CD and DVD rentals, as they cannot satisfy this double system of requirements at the same time.

Another disadvantage is that these devices only encase the protecting case, so if the goods protecting case is forced apart or the locking unit is damaged, the information carrying disc placed inside the protecting case becomes easily accessible and it can be appropriated from the place where it is displayed without any damage done to it.

Our aim with the invention was to overcome the deficiencies of the known solutions and construct a goods protection device, which provides efficient protection against the unauthorised appropriation of information carrying discs at a low cost, is easy to handle and does not require any extra space.

The construction according to the invention is based on the recognition that if unlike the known solutions an envelope-like holding unit practically consisting of one piece is created, in which only a part of the information carrying disc can be placed and fastened to the envelope with a special locking unit, then this envelope-like protecting device can even be placed in the original case of the information carrying disc, and so the task can be solved.

In accordance with the set aim the goods protection device according to the invention for the sale and especially rental distribution of information carrier discs such as CD-s and DVD-s, —which has a house encasing a storage space, and the house is provided with a fastening unit consisting of a locking piece and another locking piece co-operating with it, —the house is constructed as a protecting envelope consisting of a protecting plate and another protecting plate, at least a part of the one protecting plate and the other protecting plate of the protecting envelope is separated from each other by a space, which is maximum six times the width of the information carrying disc, and so between the one protecting plate and the other protecting plate of the protecting envelope a space is created for temporarily accommodating at least a part of the information carrying disc, the one protecting plate of the protecting envelope is surrounded by a bordering rim and the other protecting plate of the protecting envelope is surrounded by another bordering rim, where at least a part of the one bordering rim of the one protecting plate and at least a part of the other bordering rim of the other protecting plate are inseparably fastened together by a connection piece, while in the section of the bordering rims where there is no connection piece there is a passage connected to the space, and either the one protecting plate or the other protecting plate has a free flap in the vicinity of the passage, the one locking piece of the fastening unit is fixed into the free flap in a fix position, and the other locking piece of the fastening unit is connected to the one locking piece freely in its normal position, or at least partly covering the centre hole of the information carrying disc, through this hole, when it is being used.

A further criterion of the storage case according to the invention may be that a switching device suitable for providing alarm signals is installed between the one protecting plate and the other protecting plate of the protecting envelope.

In the case of a possible version of the goods protection device the switching device contains a passive oscillating circuit suitable for providing radio-frequency signals.

In the case of another different construction of the invention at least a part of the one protecting plate and/or the other protecting plate of the protecting envelope is made of high-strength plastic.

In a further different realisation of the goods protection device the one locking piece of the fastening unit fixed into the free flap is provided with a neck that can be guided through the centre hole of the information carrying disc, and the other locking piece of the fastening unit has a head that can be placed on the neck and the cross-section of which is larger than that of the neck, or the other locking piece of the fastening unit has a pin that can be guided through the centre hole of the information carrying disc as well as a head the cross-section of which is larger than that of the pin, and the one locking piece fixed into the free flap is provided with a reception element for receiving the neck. The one locking piece of the fastening unit fixed into the free flap may be provided with a neck that can be guided through the centre hole of the information carrying disc, the neck has detents suitable for flexible deformation, and the other locking piece of the fastening unit has a shoulder for dislodging the detents of the neck and a head constructed as a continuation of the shoulder.

In the case of a different version of the invention the plane of the free flap of the protecting envelope and the plane of the one protecting plate are at an angle other than 0° with respect to each other.

The most important advantage of the goods protecting device according to the invention is that due to the specially constructed protecting envelope the information carrying discs can be displayed at the place of sale so that the information carrying disc itself, the accompanying documents containing information and the storing case of the original packaging can be held in hand without the risk of the unauthorised appropriation of the product.

A further advantage is that due to the construction of the protecting envelope more original storing cases, that is more products for sale can be placed in the sales area of rental stores and shops; and the goods are not separated from the customers, which may have a favourable influence on the aesthetic effect of the sales area and also on the customers' desire to make a purchase.

It must also be regarded favourable that the protecting envelope is simple to use, the information carrying disc can be placed in it and taken out of it without needing any special skills, but the fastening unit can only be released with the help of a special opening tool. On the one part it simplifies the task of the salespersons working in the stores, and on the other part it guarantees that only those who have a special opening tool, that is salespersons, can have direct access to the products.

It is also an advantage that due to the special construction of the protecting envelope the information carrying disc intended to be appropriated may get damaged, in case the protecting envelope or the fastening unit is forced open, that is in the case of a theft attempt, so there is no point in trying, which may reduce the number of attempts, and by this it may increase the safety of the displayed products and improve the income of the stores.

BRIEF DESCRIPTION OF THE DRAWINGS

Below the storing case according to the invention is described in detail in connection with a construction example, on the basis of drawings. In the drawing:

FIG. 1 is the plan view of a possible version of the protecting envelope according to the invention, FIG. 2 is a section of FIG. 1 taken along plane II-II, FIG. 3 is the side-view of another version of the fastening unit of the protecting envelope, FIG. 4 is the side-view of an even further construction of the fastening unit of the protecting envelope.

DETAILED DESCRIPTION OF THE PREFERRED EMBODIMENTS

FIGS. 1 and 2 show a possible construction of the goods protection device according to the invention, which is suitable for partly receiving the information carrying disc 10 with a centre hole 11. It can be seen that the protecting envelope 20 is formed by a protecting plate 21, another protecting plate 22 and a free flap 24, which is the continuation of the one protecting plate 21. The one protecting plate 21 is partly surrounded by a bordering rim 21a, while the other protecting plate 22 is also partly surrounded by another bordering rim 22a. The one protecting plate 21 and the other protecting plate 22 are connected to form one single unit via a connection piece 20a running between the one bordering rim 21a and the other bordering rim 22a.

It must be pointed out here that the one protecting plate 21, the other protecting plate 22 and the connection piece 20a can be made in one piece, e.g.: die-cast, but it can also consist of several pieces, which are fixed to each other in the last phase of producing the protecting envelope 20. However, producing the unit in one piece, practically from high-strength plastic, may be definitely favourable.

FIG. 2 also shows that the unit consisting of the one protecting plate 21, the other protecting plate and the connection piece 20a connecting the one protecting plate 21 and the other protecting plate encases the space 23 in which a part of the information carrying disc 10 can be placed. In accordance with this the "t" distance of the space 23 between the one protecting plate 21 and the other protecting plate 22—in the case of this construction—is only slightly bigger than the "V" width of the information carrying disc 10, but in the interest of achieving the aim the largest size of the "t" distance can be six times the "V" width.

Returning to FIG. 1 it can also be seen that on the part of the one protecting plate 21 free from the one bordering rim 21a there is a free section 21b, while on the part of the other protecting plate 22 free from the other bordering rim 22a there is a free section 22b. Free section 21b and free section 22b are situated opposite each other, and practically they determine the passage 25 ending in the space 23 of the protecting envelope 20.

The one locking piece 31 of the fastening unit 30 is fixed into the free flap 24 of the protecting envelope 20—of the one protecting plate 21 starting from the passage 25 of the space 23—, which locking piece 31 in the case of this construction has a neck 31a and detents 31c made in the neck 31a. The other locking piece 32 also belongs to the fastening unit 30, and it is provided with a head 32a and a shoulder 32c protruding from the head 32a. The neck 31a of the one locking piece 31 is dimensioned so that it can be pushed through the centre hole 11 of the information carrying disc 10, while the head 32a of the other locking piece 32 is practically bigger than the centre hole 11 of the information carrying disc 10. The inside of the neck 31a of the one locking piece 31 is constructed in a way that the shoulder 32c of the other locking piece can slide into it in order to fasten together the one locking piece 31 and the other locking piece 32 of the fastening unit 30 on the one part and to dislodge the detents 31c of the one locking piece on the other part.

It can be seen in FIG. 1 that the space 23 of the protecting envelope 20 is constructed in a way that beside a part of the information carrying disc 10 the switching device 40 can also be placed in it, which in our case is provided with a passive oscillating circuit 41. The function of the switching device 40 is to give a signal—co-operating with the central unit of the alarm system not shown in the figures—, if somebody wants to take away the information carrying disc 10 together with the protecting envelope 20 from the place of sales, without paying.

The goods protection unit according to FIGS. 1 and 2 is used according to the following. The information carrying disc 10—to be protected against theft is placed above the free flap 24 of the protecting envelope 20, while the free flap 24 is slightly bent so that a part of the information carrying disc 10 can be slid through the passage 25 into the space 23 bordered by the one protecting plate 21, the other protecting plate 22 and the connection piece 20a of the protecting envelope 20. When the centre hole 11 of the information carrying disc 10 is above the neck 31a of the one locking piece 31 fixed into the free flap 24 of the protecting envelope 20 in a fix position, then as the free flap 24 is allowed back into its original, that is rest position, the neck 31a of the one locking piece 31 slides through the centre opening 11 of the information carrying disc 10. In this position the information carrying disc 10 cannot be pulled back from the space 23 of the protecting envelope 20 in a straight line, along its own plane, as it is arrested by the neck 31a of the one locking piece 31.

After guiding the neck 31a of the one locking piece 31 through the centre hole 11 of the information carrying disc 10, the shoulder 32c of the other locking piece 32 of the fastening unit 30 is pushed into the neck 31a of the one locking piece 31. As the shoulder 32c of the other locking piece 32 is going in the neck 31a of the one locking piece, it moves the detents 31c situated in the neck 31a in a way that they are suitable for flexible deformation. The detents 31c open out, and in this position, protruding over the centre hole 11 of the information carrying disc 10 they prevent the neck 31a of the one locking piece 31 from being pulled back through the centre hole 11 of the information carrying disc 10.

When the shoulder part 32c of the other locking piece 32 is in its final position, the fastening unit 30 grabs it and does not allow it to be pulled back from the neck 31a of the one locking piece 31. When the other locking piece 32 is in this clamped position, the head 32a of the other locking piece 32 sits on the neck 31a of the one locking piece. In this way it protects the detents 31c protruding from the neck 31a of the one locking piece 31, and —as the head 32a of the other locking piece 32 is bigger than the centre hole 11 of the information carrying disc—due to its own size it also prevents the information carrying disc 10 from being pulled off the one locking piece 31 of the fastening unit 30.

When the customer has paid for the information carrying disc, with a special tool the authorised person releases the connection between the one locking piece 31 and the other locking piece 32 of the fastening unit 30, and the shoulder 32c of the other locking piece 32 can be pulled out freely from the neck 31a of the one locking piece 31. In the course of this movement the head 32a of the other locking piece 32 moves away from the neck 31a of the one locking piece 31, and the detents 31c forced to go through flexible deformation also go back to their normal position making the way free through the centre hole 11 of the information carrying disc 10. In this way, by bending again the free flap 24, the neck 31a of the one locking piece 31 can be pulled back from the centre hole 11 of the information carrying disc, and the information carrying disc can be taken out of the space 23.

FIG. 3 shows another version of the goods protection unit. Here the protecting envelope 20 is basically the same as the one described above. As compared to the version described in connection with FIG. 1 the difference is in the construction of the fastening unit 30. In this case the one locking piece 31 placed in the free flap 24, which is the continuation of the one protecting plate 21 of the protecting envelope 20, has a relatively flat reception element, while the other locking piece 32 is provided with a pin 32b protruding from the head 32a. The head 32a of the other locking piece is bigger than the centre hole 11 of the information carrying disc 10. The pin 32b is dimensioned so that it can go through the centre hole 11 of the information carrying disc 10. At the same time the reception element 31b of the one locking piece 31 can take in the remaining part of the pin 32b of the other locking piece 32 pushed through the centre hole 11 of the information carrying disc 10.

In the course of using the goods protection unit according to FIG. 3, the information carrying disc 10 can be pushed into the space 23 created between the one protecting plate 21 and the other protecting plate 22 of the protecting envelope 20 without any difficulty until the centre hole 11 of the information carrying disc 10 is in a position right above the reception element 31b of the one locking piece 31. At this point guiding the pin 32b of the other locking piece 32 of the fastening unit through the centre hole 11 of the information carrying disc 10 it can be easily pushed into the reception element 31b of the one locking piece 31 of the fastening unit 30. In the reception element 31b the fastening unit 30 grabs the pin 32b and holds it until the connection between the one locking piece 31 and the other locking piece 32 is released with a special opening tool. At this point the pin 32b of the other locking piece 32 can be pulled out of the reception element 31b of the one locking piece 31, and the information carrying disc 10 can be taken out of the space 23 of the protecting envelope 20.

As compared to the constructions described above one of the differences in the goods protection device shown in FIG. 4 is that the one locking piece 31 fixed into the free flap 24 of the protecting envelope 20 has one single neck 31a, while the other locking piece 32 is provided with only one head 32a. The neck 31a can be pushed through the centre hole 11 of the information carrying disc 10, and the part taken through the information carrying disc 10 is received by the head 32a of the other locking piece 32. Obviously in this case too the fastening unit 30 has a part, which keeps the neck 31a of the one locking piece 31 clamped in the head 32a of the other locking piece 32 as long as the information carrying disc 10 is situated in the space 23 of the protecting envelope 20.

Another difference as compared to the constructions described above is that the plane of the one protecting plate 21 of the protecting envelope 20 and the plane of the free flap 24 forming a continuation of the former plane are at 5° angle "α" with respect to each other. This construction may be favourable, because in the case that the free flap 24 is in this position, when the information carrying disc 10 inserted in the space 23, the free flap does not need to be bent out to make it possible for the information carrying disc 10 to slide in beside the neck 31a of the one locking piece 31 protruding from the free flap 24, as even in its normal position it makes it possible to slide in the information carrying disc freely, without any obstruction.

Obviously in the case of this version too, after a part of the information carrying disc 10 is slid into the space 23, the free flap 24 needs to be bent slightly towards the information carrying disc 10 to make the neck 31a of the one locking piece 31 go through the centre hole 11 of the information carrying disc 10. Then the head 32a of the other locking piece 32 can be pulled onto the neck 31a, and by this the information carrying disc 10 can be attached to the protecting envelope 20 with the help of the one locking piece 31 and the other locking piece.

From the above examples it can be seen that the geometrical construction of the protecting envelope 20 and the construction of the one locking piece 31 and the other locking piece 32 of the fastening unit 30 can be realised in many different ways. However, it is important in each case that only a part of the information carrying disc 10 is taken in by the goods protection device, and the fastening unit 30 attaches the information carrying disc 10 only to one side of the protecting envelope 20, to the one protecting plate 21 in our case.

The goods protection device according to the invention can be used in every case when in the course of selling information carrying discs with a centre hole direct display needs to be connected with efficient goods protection.

The invention claimed is:

1. Goods protection device according to the invention for the protecting of information carrier discs, said device having a housing encasing a storage space, and the housing is provided with a fastening unit consisting of a locking piece and another locking piece co-operating with it, characterised by the housing being constructed as a protecting envelope consisting of a protecting plate and another protecting plate, at least a part of the one protecting plate and the other protecting plate of the protecting envelope being separated from each other by a space, which is a maximum six times the width of the information carrying disc, and so that between the one protecting plate and the other protecting plate of the protecting envelope a space is created for temporarily accommodating at least a part of the information carrying disc, the one protecting plate of the protecting envelope is surrounded by a bordering rim and the other protecting plate of the protecting envelope is surrounded by another bordering rim, where at least a part of the one bordering rim of the one protecting plate and at least a part of the other bordering rim of the other protecting plate are inseparably fastened together by a connection piece, while in the section of the bordering rims where there is no connection piece there is a passage connected to the space, and either the one protecting plate or the other protecting plate has a free flap in the vicinity of the passage, the one locking piece of the fastening unit is fixed into the free flap in a fix position, and the other locking piece of the fastening unit 30 is connected to the one locking piece in its normal position, or at least partly covering a centre hole of the information carrying disc, through this hole, when it is being used.

2. Goods protection device as in claim 1, characterised by that a switching device suitable for providing alarm signals is installed between the one protecting plate and the other protecting plate of the protecting envelope.

3. Storing case as in claim 2, characterised by that the switching device contains a passive oscillating circuit suitable for providing radio-frequency signals.

4. Storing case as in claim 1, characterised by that at least a part of the one protecting plate or the other protecting plate of the protecting envelope is made of high-strength plastic.

5. Storing case as in claim 1, characterised by that the one locking piece of the fastening unit fixed into the free flap is provided with a neck that can be guided through the centre hole of the information carrying disc, and the other locking piece of the fastening unit has a head that can be placed on the neck and the cross-section of which is larger than that of the neck.

6. Storing case as in claim 1, characterised by that the other locking piece of the fastening unit has a pin that can be guided through the centre hole of the information carrying disc as well as a head the cross-section of which is larger than that of the pin, and the one locking piece of the fastening unit fixed into the free flap is provided with a reception element for receiving the neck.

7. Storing case as in claim 1, characterised by that the one locking piece of the fastening unit fixed into the free flap is provided with a neck that can be guided through the centre hole of the information carrying disc, the neck has detents suitable for flexible deformation, and the other locking piece of the fastening unit has a shoulder for dislodging the detents of the neck and a head constructed as a continuation of the shoulder.

8. Storing case as in claim 1, characterised by that the plane of the free flap of the protecting envelope and the plane of the one protecting plate are at an angle ct other than 0° with respect to each other.

9. Storing case as in claim 1 characterized by at least a part of one protection plate 21 and at least a part of the other protection plate 22 of the protective envelope 20, made of high strength plastic.

10. Goods protection device as defined in claim 1 wherein the information carrier discs are selected from the group consisting of CD-s and DVD-s.

* * * * *